United States Patent
Lisowski et al.

(10) Patent No.: US 10,723,855 B2
(45) Date of Patent: Jul. 28, 2020

(54) POLYISOCYANURATE FOAM COMPOSITES AND THEIR PRODUCTION AND USE

(71) Applicant: Rockwool International A/S, Hedehusene (DK)

(72) Inventors: Jakub Lisowski, Nottinghamshire (GB); Dorte Bartnik Johansson, Roskilde (DK); Anders Bach, Copenhagen (DK)

(73) Assignee: ROCKWOOL INTERNATIONAL A/S, Hedehusene (DK)

( * ) Notice: Subject to any disclaimer, the term of this patent is extended or adjusted under 35 U.S.C. 154(b) by 0 days.

(21) Appl. No.: 15/105,287

(22) PCT Filed: Dec. 15, 2014

(86) PCT No.: PCT/EP2014/077851
§ 371 (c)(1),
(2) Date: Jun. 16, 2016

(87) PCT Pub. No.: WO2015/091408
PCT Pub. Date: Jun. 25, 2015

(65) Prior Publication Data
US 2016/0319096 A1    Nov. 3, 2016

(30) Foreign Application Priority Data

Dec. 16, 2013 (EP) .................................. 13197466

(51) Int. Cl.
*C08J 9/14* (2006.01)
*C08J 9/00* (2006.01)

(52) U.S. Cl.
CPC ........... *C08J 9/0085* (2013.01); *C08J 9/0066* (2013.01); *C08J 9/141* (2013.01); *C08J 2201/02* (2013.01); *C08J 2203/14* (2013.01); *C08J 2205/10* (2013.01); *C08J 2375/04* (2013.01)

(58) Field of Classification Search
CPC ........ C08J 9/0085; C08J 9/0066; C08J 9/141; C08J 2201/02; C08J 2203/14; C08J 2205/10; C08J 2375/04
See application file for complete search history.

(56) References Cited

U.S. PATENT DOCUMENTS

| | | | |
|---|---|---|---|
| 5,182,309 A * | 1/1993 | Hutzen | .................... C08J 9/127 521/107 |
| 2004/0082676 A1* | 4/2004 | Douglas | .............. B29C 44/3442 521/155 |
| 2007/0015842 A1 | 1/2007 | Moerman et al. | |
| 2010/0116829 A1 | 5/2010 | Van Der Wal et al. | |

FOREIGN PATENT DOCUMENTS

| | | |
|---|---|---|
| WO | 9967086 A1 | 12/1999 |
| WO | 2006008780 A1 | 1/2006 |
| WO | 2010054317 A2 | 5/2010 |
| WO | 2010088227 A1 | 5/2010 |
| WO | 2013024176 A1 | 2/2013 |
| WO | 2013/102540 A1 | 7/2013 |

OTHER PUBLICATIONS

International search report corresponding to International Patent Application No. PCT/EP2014/077851, dated Feb. 27, 2015, 3 pages.

* cited by examiner

*Primary Examiner* — John M Cooney
(74) *Attorney, Agent, or Firm* — Tarolli, Sundheim, Covell & Tummino LLP

(57) ABSTRACT

The invention relates to a method for the production of a rigid PIR foam composite containing man-made vitreous fibres (MMVF), the method comprising: providing MMVF, wherein at least 50% of the fibres by weight have a length of less than 250 μm; providing a polyol component; mixing the MMVF and polyol component in a ratio such that the amount of MMVF is at least 10% by weight based on total weight of polyol component; emulsifying pentane with the mixture of polyol component and MMVF; inducing foam formation by addition of a further component which comprises isocyanate.

13 Claims, No Drawings

POLYISOCYANURATE FOAM COMPOSITES AND THEIR PRODUCTION AND USE

RELATED APPLICATIONS

This application is a 35 U.S.C. § 371 national stage application of PCT Application No. PCT/EP2014/077851, filed on Dec. 15, 2014, which claims priority from European Application No. 13197466.9 filed on Dec. 16, 2013, the contents of which are incorporated herein by reference in the entireties.

FIELD OF THE INVENTION

The present invention relates to the production of insulating polyisocyanurate (PIR) foam composites, suitable for use in insulation applications. The invention relates to the foam composites themselves and to foam precursors which can be used to produce such foam composites.

BACKGROUND OF THE INVENTION

It is known to provide rigid polyisocyanurate (PIR) foams for uses such as building insulation. Such foams are conventionally manufactured by the provision of a polyol component and an isocyanate component, one or both of these components optionally containing other ingredients such as surfactants, catalysts, etc., blending a blowing agent, often pentane, with the polyol component or the isocyanate component (usually the polyol component) and mixing the two in order to induce foaming.

It would be desirable to be able to improve the production efficiency of such methods, especially to improve the efficiency and effectiveness of the step of mixing the pentane blowing agent with the polyol component.

Such pentane-blown PIR foams are commonly characterised by their lambda value, which is a measure of their thermal conductivity. A lower value of lambda is beneficial as it signifies lower thermal conductivity and consequently good insulation properties. Pentane-blown PIR foams can exhibit good insulation properties when first formed but there is a tendency for their insulation properties to deteriorate over time, either on storage or when in position for use. Namely, the value of lambda tends to increase. It would be desirable to be able to provide pentane-blown PIR foams which exhibit reduced deterioration in lambda value over time.

WO 2010/054317 describes a pentane-blown PIR foam. However, the method disclosed will suffer from the problem that polyols are difficult to mix with pentane owing to pentane's poor miscibility with polyols. This problem can be overcome by the addition of man-made vitreous fibres, according to the first aspect of the invention as described below.

SUMMARY OF THE INVENTION

According to a first aspect of the invention we provide a method for the production of a rigid PIR foam composite containing man-made vitreous fibres (MMVF), the method comprising:
    providing MMVF, wherein at least 50% of the fibres by weight have a length of less than 250 μm;
    providing a polyol component;
    mixing the MMVF and polyol component in a ratio such that the amount of MMVF is at least 10% by weight based on total weight of polyol component;
    emulsifying pentane with the mixture of polyol component and MMVF;
    inducing foam formation by addition of a further component which comprises isocyanate.

DETAILED DESCRIPTION OF THE INVENTION

In the method of the invention a polyol component suitable for generation of a PIR foam is mixed with a defined proportion of the defined MMVF to form a premix blend prior to blending it with the pentane blowing agent. We find surprisingly that this results in greater ease of mixing the pentane into the polyol component and hence improved processing efficiency. This is particularly surprising given that the viscosity of the polyol component is generally found to be higher when it includes the MMVF than prior to their inclusion.

We also find that the inclusion of MMVF in the method in this way results in a final product which exhibits less deterioration in lambda value over time.

It has also been found that the average cell size of the resulting foam is lower than equivalent foams not including MMVF. This too was surprising as it would have been expected that inclusion of MMVF would result in larger average cell size due to an increase in cell wall instability.

It has also been found that the closed cell content is greater in the case of foam composites comprising MMVF than corresponding foam composites not including MMVF. This too was surprising since fibres are known to create open cells.

Without wishing to be limited by theory, we believe that the reduced deterioration in lambda value may be linked to these two effects on cell size and closed cell content We find that these effects are demonstrated in the case of PIR foam which is blown with pentane as the blowing agent. This effect does not appear to be linked with other blowing agents such as water.

As acknowledged above, it is known to produce pentane-blown rigid PIR foam materials for applications including thermal insulation. It is also known to form composites with fibrous materials such as glass fibre stacks and mats. For instance, US 2007/0015842 describes a glass fiber reinforced foam which can be PUR or PIR foam but this is reinforced with a glass fibre stack. Similarly, WO 99/67086 describes a metal sandwich panel having a core of PIR or PUR foam and including glass fibres as reinforcement. However, these fibres are in the form of a mat or in the form of long individual fibres, for instance of length at least 0.75 inches. Likewise, WO 2006/008780 also describes composite materials which can be based on PUR or PIR foam, including an inert material dispersed within the foam. This inert material can be chosen from a large number of materials which include glass fibres, although the size of these is unspecified.

In each of these documents the inclusion of any glass fibres is presented in order to provide reinforcement, but there is no indication that the choice of certain types and amounts of MMVF, included at a particular stage of the process, can lead to processing advantages or improved lambda ageing properties.

In our earlier publication WO 2013/024176 we describe foam composites comprising man-made vitreous fibres at least a certain amount of which have average length not more than 100 microns. PIR foams are mentioned but the examples are all of PUR foam, and pentane as blowing agent is not discussed.

Furthermore, we find that the pentane-blown PIR foam composites produced according to the present invention show excellent physical stability properties, especially for instance in comparison with a PUR water-blown foam composite also containing the same amount of the same type of MMVF.

Schamow et al, in Plaste and Kautschuk 26 Jahrgang, Heft January/1979, "Anwendung zerkleinerter Glasfasern als modifizierender Zusatz fuer Polyurethanehartschaumstoff" discuss the use of continuous glass fibres as a modifying filler for water-blown PUR foams. Accordingly, these publications do not address the particular problems which arise with the production of pentane-blown PIR foam.

In WO 2010/088227, n-pentane is used as a blowing agent in the preparation of a PIR foam. However, in this case, the blowing agent is mixed with the polyisocyanate instead of mixing with the polyol. The use of MMVF is not described.

We have found that the use of n-pentane, c-pentane and iso-pentane as blowing agent can result in problems such as phase separation when added to the premix blend, which subsequently results in inconsistent foam production, high viscosity of resulting emulsions, mixing difficulties, and high vapour pressures. We have surprisingly found that these disadvantages can be reduced by mixing the polyol with MMVF prior to addition of the pentane blowing agent. Preferably, the MMVF used are stone wool fibres. The addition of MMVF improves compatibility of pentane, particularly n-pentane, with the polyol. The MMVF also reduces evaporation of the pentane during mixing.

US 2010/116829 describes the addition of a blowing agent, which, amongst other things, may be pentane, However, the only Example in this document employs hydrofluorocarbons as blowing agents. This document also fails to overcome the above-mentioned problems associated with using pentane, since MMVF are not described.

In a further aspect of the invention, we provide a novel foam composite formed of rigid pentane-blown PIR foam and comprising at least 5% and not more than 85%, by weight of the foam composite, of man-made vitreous fibres having average length not more than 250 μm.

This novel foam composite can be made by a method according to the first aspect of the invention.

In yet a further aspect of the invention we provide a foamable composition comprising man-made vitreous fibres (MMVF) and a foam precursor suitable for the production of a PIR foam, wherein at least 50% by weight of the man-made vitreous fibres have a length of less than 250 μm, and wherein the amount of MMVF in the foamable composition is in the range 10 to 85% based on total weight of composition.

This novel foamable composition may be formed during the method of the first aspect of the invention.

According to the present invention, the weight percentage of fibres above or below a given fibre length is measured with a sieving method. A representative sample of the man-made vitreous fibres is placed on a wire mesh screen of a suitable mesh size (the mesh size being the length and width of a square mesh) in a vibrating apparatus. The mesh size can be tested with a scanning electron microscope according to DIN ISO 3310. The upper end of the apparatus is sealed with a lid and vibration is carried out until essentially no further fibres fall through the mesh (approximately 30 mins). If the percentage of fibres above and below a number of different lengths needs to be established, it is possible to place screens with incrementally increasing mesh sizes on top of one another. The fibres remaining on each screen are then weighed.

The man-made vitreous fibres used according to the invention must have at least 50% by weight of the fibres with a length less than 250 micrometres as measured by the method above. Preferably at least 50% by weight of the fibres have a length less than 200 micrometres. Preferably, the length distribution of the man-made vitreous fibres is such that at least 50% by weight of the man-made vitreous fibres have a length of less than 175 micrometres, more preferably less than 165 micrometres.

Preferably, at least 60% of the man-made vitreous fibres by weight have a length less than 200 micrometres, more preferably less than 175 micrometres and most preferably less than 165 micrometres.

Generally, the presence of longer man-made vitreous fibres is found to be a disadvantage in terms of the viscosity of the foamable composition and the ease of mixing. Therefore, it is preferred that at least 80% or even 85 or 90% of the mineral fibres have a length less than 250 micrometres. Similarly, it is preferred that at least 95% of the man-made vitreous fibres by weight have a length less than 250 micrometres.

The best results can be achieved when at least 90% by weight of the fibres have a length less than 200 micrometres and at least 75% of the fibres by weight have a length less than 175 micrometres.

Man-made vitreous fibres are well known. They are fibres formed by providing inorganic/mineral starting materials, melting these starting materials to form a mineral melt and then forming the mineral melt into fibres.

The fibres can be any type of man-made vitreous fibres, but are preferably stone fibres. In general, stone fibres have a content of alkali metal oxides (sodium oxide and potassium oxide) less than the content of alkaline earth metal oxides (calcium oxide and magnesium oxide).

Preferred MMVF have a content of oxides as follows:
$SiO_2$ 25 to 50%, preferably 38 to 48%
$Al_2O_3$ 12 to 30%, preferably 15 to 28%, more preferably 17 to 23%
$TiO_2$ up to 2%
$Fe_2O_3$ 2 to 12%
CaO 5 to 30%, preferably 5 to 18%
MgO up to 15%, preferably 1 to 8% or 4 to 10%
$Na_2O$ up to 15%
$K_2O$ up to 15%
$P_2O_5$ up to 3%
MnO up to 3%
$B_2O_3$ up to 3%.

These values are all quoted as weight % oxides, with iron expressed as $Fe_2O_3$, as is conventional.

It is believed that the unique surface properties of stone wool fibres improve the compatibility. The surface energy is different for stone wool fibres compared to glass fibres, which impacts the wetting of the fibres giving a good compatibility for stone wool fibres in this foam system.

Composites including stone fibres of the above composition have also been found to have improved fire resistance as compared with composites in which the MMVF used do not contain a significant level of iron.

An alternative stone wool composition useful in the invention has oxide contents in the following ranges:
$SiO_2$ 37 to 42%
$Al_2O_3$ 18 to 23%
CaO+MgO 34 to 39%
$Fe_2O_3$ up to 1%
$Na_2O+K_2O$ up to 3%

Whilst stone fibres are preferred, the use of glass fibres, slag fibres and ceramic fibres is also possible.

The man-made vitreous fibres used in the present invention are preferably produced with a cascade spinner or a spinning cup. Preferably, the method of the invention includes the step of producing the fibres with a cascade spinner or a spinning cup. Traditionally, fibres produced by these methods have been used for insulation, whilst continuous glass fibres have been used for reinforcement in composites. Continuous fibres (e.g. continuous E glass fibres) are known to be stronger than discontinuous fibres produced by cascade spinning or with a spinning cup (see "Impact of Drawing Stress on the Tensile Strength of Oxide Glass Fibres", *J. Am. Ceram. Soc.*, 93 [10] 3236-3243 (2010)). Nevertheless, foam composites comprising short, discontinuous fibres have a compressive strength that is at least comparable with foam composites comprising continuous glass fibres of a similar length. This level of strength is combined with good fire resistance, a high level of thermal insulation and cost efficient production.

In order to achieve the required length distribution of the fibres, it will usually be necessary for the fibres to be processed further after the standard production. The further processing will usually involve grinding or milling of the fibres for a sufficient time for the required length distribution to be achieved.

Usually, the fibres have an average diameter of from 2 to 7 micrometres, preferably from 2 to 6 or from 3 to 6 micrometres. In one preferred embodiment, the fibres have an average diameter of from 3 to 4 micrometres. In another preferred embodiment, the fibres have an average diameter of from 5 to 6 micrometres. Thin fibres, as preferred in the invention, are believed to provide better reinforcement. Thinner fibres provide better reinforcement of the cells.

Thinner fibres are generally more flexible than thick fibres. In other words, with thinner fibres the diameter/length ratio decreases.

According to the present invention, the average fibre diameter is determined for a representative sample by measuring the diameter of at least 200 individual fibres by means of the intercept method and scanning electron microscope or optical microscope (1000× magnification).

The essential and preferred MMVF properties discussed are applicable to the method and foam composite and foamable composition.

It is well-known to form PIR foams by combination and reaction of an appropriate polyol component and an appropriate isocyanate component, in appropriate ratios. Suitable components are chosen for use according to the invention, in known manner.

In the invention the polyol component is mixed with appropriately-sized MMVF. This mixing can be achieved by any suitable method, for instance by a mechanical mixing method such as use of a rotary mixer or simply by stirring.

The fibres used in the present invention can be surface-treated with binder, oil or coatings which, as a result, can be included in the polyol component as an additive if it is chemically compatible with the composition. The fibres used usually contain less than 10% binder based on the weight of the fibres and binder. The binder is usually present in the polyol component at a level less than 5% based on the total weight of the polyol component. The resulting foam composite usually contains less than 5% binder, more usually less than 2.5% binder. In a preferred embodiment, the man-made vitreous fibres used are not treated with binder.

Preferably, the blend of polyol component and MMVF comprises at least 15% by weight, more preferably at least 20% by weight, most preferably at least 35% by weight of man-made vitreous fibres.

The foam composite produced in the method, and the novel foam composite of the invention, preferably comprise at least 10% by weight, more preferably at least 15% by weight, most preferably at least 20% by weight of man-made vitreous fibres.

Usually the blend of polyol component and MMVF comprises less than 85% by weight, preferably less than 80%, more preferably less than 75% by weight man-made vitreous fibres.

The foam composite produced in the method, and the novel foam composite of the invention, preferably comprise less than 80% by weight, preferably less than 60%, more preferably less than 55% by weight man-made vitreous fibres.

In order to induce foaming it is necessary to emulsify pentane as blowing agent into the polyol component once it has been blended with the MMVF. This can be done in known manner, for instance by mechanically mixing using a rotary mixer, static mixing or simply by stirring.

The pentane is usually present in the emulsified mixture of polyol component and MMVF in an amount from 1 to 25% by weight of total polyol component plus MMVF, preferably 10 to 18%.

In general as the amount of fibres used increases, so does the amount of pentane.

Pentane has the advantage over other blowing agents that it is more environmentally friendly and cost effective. Accordingly the invention provides the important benefit of allowing the use of pentane as a blowing agent. For example, the use of HFC blowing agents for polyurethane and polyisocyanurate foams is being phased out based on the Montreal Protocol from 1987. These have zero ODP (ozone depleting potential) but a very high GWP (global warming potential). C5-hydrocarbons have zero ODP and almost zero GWP and these are very cost effective.

The pentane can be c-pentane, i-pentane or n-pentane or a mixture of two or more of these. The choice between c-pentane, i-pentane and n-pentane is dependent on the application and production method. They are quite different in boiling point, initial thermal conductivity, aged thermal conductivity and price. The preferred pentane in this invention is n-pentane based on the price and aged thermal conductivity.

The polyol component comprises a suitable polyester-derived or polyether-derived polyol, as is known for the formation of PIR foam.

The polyol component is usually supplied as a pre-mixed component that comprises polyol and any or all of catalyst(s), flame retardant(s), surfactants and water. Generally it comprises all of these. Such a pre-formed blend of polyol with additives is commonly known as a pre-polyol.

After blending the polyol component (containing MMVF) and pentane to form the emulsified mixture, foaming can be induced by adding a further component comprising an isocyanate. Suitable isocyanate components are known for the formation of PIR foams.

The isocyanate for use either as the foam precursor or to be added as a further component to the foamable composition to induce foam formation is selected on the basis of the density and strength required in the foam composite as well as on the basis of toxicity. It can, for example, be selected from methylene polymethylene polyphenyl isocyanates (PMDI), methylene diphenyl diisocyanate (MDI) or toluene diisocyanate (TDI), PMDI or MDI being preferred. One particularly suitable example is diphenylmethane-4,4'-diisocyanate. Other suitable isocyanates are commercially available from, for example, Bayer Material Science, BASF or DOW Chemicals. The NCO functionality of the polymeric isocyanate is above 2, and preferably above 2.7 so as to achieve a high degree of cross-linking giving high strength and good fire properties in the PIR foam.

The polyol and isocyanate components and the resulting foam composite can contain additives in addition to the man-made vitreous fibres. When it is desired to include additives in the foam composite, as an alternative to including the additives in the polyol component or the isocyanate component, the additive can be included with a further component that is added to the other components to induce foam formation.

As an additive, it is possible for the polyol component and/or the foam composite to comprise a fire/flame retardant such as expandable powdered graphite, aluminium trihydrate, magnesium hydroxide, and/or nitrogen- or phosphorus-containing polymer.

The total amount of fire/flame retardant in the polyol component is preferably from 3 to 30% by weight, more preferably from 5 to 20% by weight and most preferably from 8 to 15% by weight, based on polyol component before addition of MMVF.

The total quantity of fire/flame retardant present in the foam composite is preferably from 1 to 10%, more preferably from 2 to 8% and most preferably from 3 to 7% by weight.

Once the fibres and polyol component have been mixed, and the pentane has been emulsified into the blend, the formation of a foam can then be induced. The manner in which the foam is formed is known to the person skilled in the art. In this respect, reference is made to "Handbook of Polymeric Foams and Foam Technology" by Klempner et al.

Mixing of the isocyanate component into the blend can be carried out in a high pressure mixing head as commercially available. This mixing can be achieved by any suitable method, for instance by a mechanical mixing method such as use of a rotary mixer or simply by stirring.

In one embodiment of the method of the invention, the isocyanate component comprises further man-made vitreous fibres, wherein at least 50% by weight of the further man-made vitreous fibres have a length of less than 250 micrometres. Including man-made vitreous fibres in both the polyol component and the isocyanate component can increase the overall quantity of fibres in the foam composite, by circumventing the practical limitation on the quantity of fibres that can be included in the polyol component itself.

For example the polyol component could comprise a polyol, man-made vitreous fibres and other additives. Then foaming could be induced by emulsification of pentane into the blend followed by the addition, as the further component, of a mixture of isocyanate and further man-made vitreous fibres, wherein at least 50% of the man-made vitreous fibres have a length of less than 250 micrometres.

The quantity of man-made vitreous fibres in the isocyanate component, if MMVF are present, is preferably at least 10% by weight, based on the weight of the further component. More preferably the quantity is at least 20% or at least 30% based on the weight of the further component. Usually, the isocyanate component comprises less than 80% by weight, preferably less than 60%, more preferably less than 55% by weight man-made vitreous fibres.

The foam composite made according to the invention can be used as basic insulation material in numerous applications. For instance it can be used in various building applications such as ETICS, cavity wall and sandwich panels. These applications benefit from the decreased water absorption of the composite which is a result of the presence of more closed cells and smaller cells.

The invention will now be illustrated with reference to the following examples.

Example 1: Improved Foam Properties

Two polyisocyanurate (PIR) foam samples were produced, one with fibres according to the present invention and one without fibres. Both samples had equal relative content of all components except that fibres were added to one of the samples. To the sample with fibres, an additional amount of pentane blowing agent was added to obtain equal density of the two samples. First, a polyol premix was produced with composition described in Table A:

TABLE A

| Premix 1 | |
|---|---|
| | Content |
| Polyol | 80.7 |
| Water | 0.40 |
| DMCHA (Dimethyl cyclohexylamine) | 0.16 |
| Kosmos 75 (Trade name for potassium octate bought from Evonik) | 4.20 |
| Tegostab B-8871 (Trade name for a silicone surfactant bought from Evonik) | 2.4 |
| TEP (Triethyl phosphate) | 12.1 |

Two foams were produced using this premix:

TABLE B

| | Foam 1 (comparative) | Foam 2 |
|---|---|---|
| Premix 1 | 140 g | 140 g |
| Fibres | | 125.2 g |
| n-Pentane | 19.4 g | 23.7 g |
| MDI (isocyanate) | 212 g | 212 g |
| Free rise density | 40 kg/m3 | 40 kg/m3 |

The two foams were analyzed for bubble size, closed cell ratio and thermal conductivity: First SEM pictures of the foams were analyzed for bubble size—100 bubbles were identified in each picture and the bubble diameter was determined and average bubble size was calculated by taking the mean diameter of the 100 bubbles. Closed cell ratio was determined using ISO 4590 and thermal conductivity changes over time were determined for the two foams using the standard EN 12667. Results are tabulated below in Table C.

TABLE C

| | Foam 1 (comparative) | Foam 2 |
|---|---|---|
| Average bubble diameter | 48 μm | 44 μm |
| Closed cell ratio | 90% | 93% |
| Difference in lambda after 14 days ageing at room temperature | 4.6 mW/mK | 4.3 mW/mK |

As can be seen from Table C, smaller bubbles were obtained for the foam containing fibers and the ratio of closed cell is also better for the foam containing fibers.

These parameters are important in cell stability and particularly in ageing of thermal conductivity of the foam which is also seen to be improved for the final foam containing fibers compared to the foam without fibers.

Example 2: Water Blown Foam Vs. Pentane Blown Foam

Two PIR foams were produced, both having a free rise density of 40 and an index of 300 equivalents of NCO/equivalents of OH. The first foam was water blown and the second was pentane blown. Initial thermal conductivity (lambda) was measured along with thermal conductivity after 14 days of storage at room temperature. The increase in lambda over time was measured:

TABLE D

|  | Δλ after 14 days storage at room temperature [mW(mk] |
| --- | --- |
| Water blown | 8.0 |
| Pentane blown | 4.3 |

The pentane blown foam loses less of its insulating properties compared to the water blown foam.

Example 3: PUR Vs. PIR Foam with Fibres

A PUR and a PIR foam were produced having densities of 45 kg/m3. Both contained 25% mineral wool fibres based on total weight. Both samples were aged accelerated at 70 C and 95% relative humidity. Initial and aged dimensions of the samples were compared and the changes in dimensions were calculated:

TABLE E

|  | Dimensional stability Change in dimension [%] |
| --- | --- |
| PUR (water blown) with 25% MW fibres | -6% |
| PIR (pentane blown) with 25% MW fibres | 3% |

As can be seen, PIR containing fibres is more dimensionally stable than PUR containing the same amount of fibres.

Example 4: Comparison of Mixing Times for Foams with and without Fibres Present The first part of the mixing relates to mixing of the liquid polyol with the pentane to form the premix blend. Once the initial mixing has been carried out, the second part of the mixing is more vigorous so as to make a homogenous blend. The first part of the mixing is the most critical with regard to loss of pentane. The second part of the mixing is more critical with regard to producing a homogenous blend of polyol and pentane in order to provide for good product performance.

TABLE F

|  | Foam 1 (without fibres) | Foam 2 (with fibres) |
| --- | --- | --- |
| First part of the mixing: Mixing time at 100 rpm (hand mixed) to obtain an initial pre-blend | 18 seconds | 10 seconds |
| Second part of the mixing: Mixing time at 3000 rpm (hand mixed) to obtain a homogeneous pre-blend ready to mix with the MDI | 10 seconds | 10 seconds |
| Loss of pentane (defined as additional pentane added to reach the defined amount of pentane in the recipe) | 6.0 g | 3.0 g |

As can be seen, when no fibres are present in the mixture of polyol and pentane when the first part of the mixing takes place, it is necessary to mix for longer to achieve a blend that is suitable. This means that more pentane is required. On the contrary, when fibres are present, there is far less pentane loss owing to a shorter mixing time. It is believed that the presence of fibres reduces the ability of pentane to evaporate during mixing.

The invention claimed is:

1. A method for the production of a rigid PIR foam composite containing man-made vitreous fibres (MMVF), the method comprising:
   providing MMVF, wherein at least 90% of the fibres by weight have a length of less than 200 μm, and at least 75% of the fibres by weight have a length of less than 175 μm;
   providing a polyol component, wherein the polyol component is a polyester-derived or polyether-derived polyol;
   mixing the MMVF and polyol component in a ratio such that the amount of MMVF is at least 10% by weight based on total weight of polyol component;
   adding 1% to 25% by weight of n-pentane based upon the amount of the polyol component and MMVF;
   emulsifying n-pentane with the mixture of polyol component and MMVF;
   inducing foam formation by addition of a further component which comprises isocyanate;
   wherein the rigid PIR foam composite has an average bubble diameter of less than 48 μm and a closed cell ratio of greater than 90%.

2. A method according to claim 1 wherein at least 75% of the man-made vitreous fibres by weight have a length less than 175 micrometres and at least 95% of the man-made vitreous fibres by weight have a length less than 200 micrometers.

3. A method according to claim 1, wherein the fibres have an average diameter of from 2 to 6 micrometers.

4. A method according to claim 1, wherein the man-made vitreous fibres have a content of oxides as follows:
   $SiO_2$ 25 to 50 wt %
   $Al_2O_3$ 12 to 30 wt %
   $TiO_2$ up to 2 wt %
   $Fe_2O_3$ 2 to 12 wt %
   CaO 5 to 30 wt %
   MgO up to 15 wt %
   $Na_2O$ up to 15 wt %
   $K_2O$ up to 15 wt %
   $P_2O_5$ up to 3 wt %

MnO up to 3 wt %
B$_2$O$_3$ up to 3 wt %.

5. A method according to claim 1, wherein the amount of MMVF based on polyol component is at least 15% by weight.

6. A method according to claim 1, wherein the amount of MMVF based on polyol component is less than 85% by weight.

7. A method according to claim 1 wherein the MMVF are stone fibres.

8. A method according to claim 3, wherein the fibres have an average diameter of from 3 to 6 micrometers.

9. A according to claim 4, wherein the man-made vitreous fibres have a content of oxides as follows:

SiO$_2$ 38 to 48 wt %
Al$_2$O$_3$ 15 to 28 wt %
TiO$_2$ up to 2 wt %
Fe$_2$O$_3$ 2 to 12 wt %
CaO 5 to 18 wt %
MgO up to 15 wt %
Na$_2$O up to 15 wt %
K$_2$O up to 15 wt %
P$_2$O$_5$ up to 3 wt %
MnO up to 3 wt %
B$_2$O$_3$ up to 3 wt %.

10. A method according to claim 5, wherein the amount of MMVF based on polyol component is at least 20% by weight.

11. A method according to claim 5, wherein the amount of MMVF based on polyol component is at least 35% by weight.

12. A method according to claim 6, wherein the amount of MMVF based on polyol component is less than 80% by weight.

13. A method according to claim 6, wherein the amount of MMVF based on polyol component is less than 75% by weight.

* * * * *